United States Patent [19]

Takeuchi et al.

[11] Patent Number: 4,703,244
[45] Date of Patent: Oct. 27, 1987

[54] PULSE MOTOR CONTROL APPARATUS

[75] Inventors: Kunihiko Takeuchi, Kawasaki; Yuge Morishige, Funabashi, both of Japan

[73] Assignee: Tokyo Keiki Company Ltd., Tokyo, Japan

[21] Appl. No.: 855,363

[22] Filed: Apr. 24, 1986

[30] Foreign Application Priority Data

May 2, 1985 [JP] Japan .................. 60-93849

[51] Int. Cl.⁴ .............................. H02P 8/00
[52] U.S. Cl. .................... 318/696; 318/685
[58] Field of Search .............. 318/696, 685

[56] References Cited

U.S. PATENT DOCUMENTS 4,518,904 5/1985 MacLeod et al. .............. 318/685

Primary Examiner—William M. Shoop, Jr.
Assistant Examiner—Saul M. Bergmann
Attorney, Agent, or Firm—Wenderoth, Lind & Ponack

[57] ABSTRACT

A frequency divided pulse is produced by frequency dividing a clock signal by speed instruction data. When the current position of the pulse motor has not yet reached a set desired position, a frequency divided pulse is outputted as a forward rotation control pulse. When the current position has exceeded said set position, a frequency divided pulse is outputted as a reverse rotation control pulse. If the set desired position is changed while the pulse motor is rotating, this change of setting is detected and the output of the frequency divided pulse is inhibited for a predetermined settling period of time, thereby stopping the pulse motor. After the vibration of the rotor which occurs during the stepping of the pulse motor is settled, the reverse rotation of the pulse motor can be started, thereby preventing the occurrence of the step-out phenomenon of the pulse motor upon reverse rotation.

2 Claims, 14 Drawing Figures

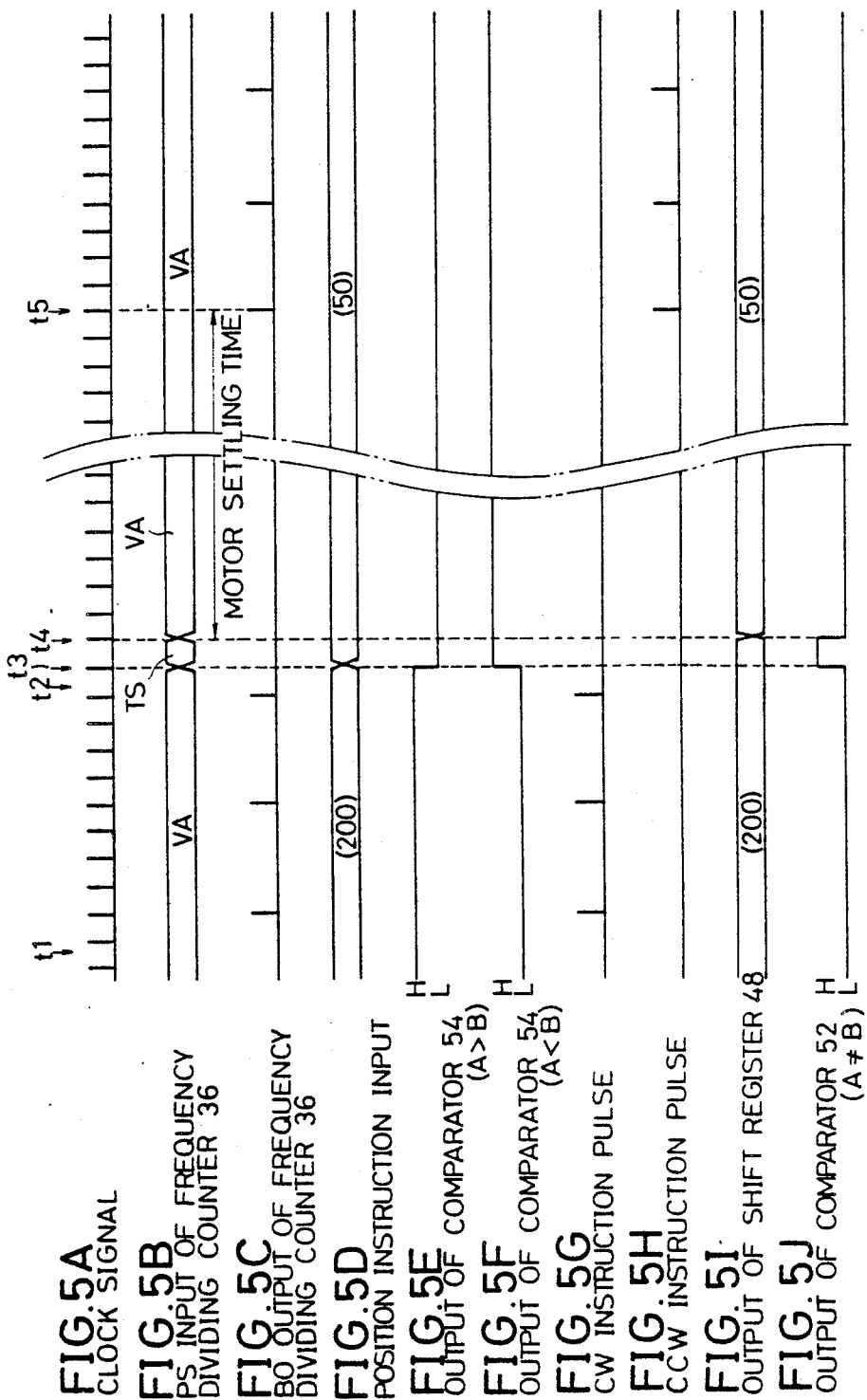

PULSE MOTOR CONTROL APPARATUS

BACKGROUND OF THE INVENTION

The present invention relates to a pulse motor control apparatus for controlling speed and rotating position of a pulse motor on the basis of a pulse signal and, more particularly, to a pulse motor control apparatus adapted to prevent a step-out phenomenon which occurs when the rotating direction of the pulse motor is switched to the opposite direction when the pulse motor is rotating.

As a conventional pulse motor control apparatus, there has been known an apparatus as shown in, e.g., FIG. 1. In the diagram, a frequency dividing counter 10 performs the count-down operation on the basis of a clock signal which is supplied from a clock pulse generator 20. Speed instruction data is inputted from a speed setting device 22 to a preset terminal PS of the counter 10. Upon completion of the count-down operation, a borrow signal is outputted to a borrow terminal BO of the counter 10. The borrow terminal BO is connected to a load terminal LD of the counter 10. The borrow terminal BO is further connected to one input of each of AND gates 12 and 14 each having two input terminals, respectively.

On the other hand, position instruction data indicative of a rotating position (hereinafter, simply referred to as a "position") of a rotor of a pulse motor 24 is supplied to an input terminal A of comparator 16 from a position setting device 26. An output terminal Q of a position counter 18 is connected to another input terminal B of the comparator 16. A count value of the position counter 18 is outputted to the output terminal Q. An output of the AND gate 14 is connected to a count-up terminal CU of the position counter 18. An output of the AND gate 12 is connected to a count-down terminal CD of the counter 18. The position counter 18 executes the count-up and count-down operations in response to pulses which are inputted to the terminals CU and CD. The count value of the counter 18 is compared with a value of the position instruction data by the comparator 16. Namely, inputs A and B are compared and when A is smaller than B, a signal at a high ("H") level as a logic value is outputted to the AND gate 12. When A is larger than B, a signal at a high ("H") level as a logic value is outputted to the AND gate 14.

The outputs of the AND gates 12 and 14 are connected to a drive circuit 28 of the pulse motor 24, respectively, thereby allowing a driving pulse signal to be inputted to the drive circuit 28. The output of the AND gate 12 serves as a CCW instruction pulse to rotate the pulse motor counterclockwise (CCW). The output of the AND gate 14 serves as a CS instruction pulse to rotate the pulse motor clockwise (CW).

The operation of this conventional apparatus will then be described. First, the speed instruction data of the rotating speed set by the speed setting device 22 is inputted to the preset terminal PS of the frequency dividing counter 10. The counter 10 always executes the count-down operation in response to the clock signal from the clock pulse generator 20 and outputs a borrow pulse to the borrow terminal BO each time the count-down operation is completed. Since the borrow terminal BO is connected to the load terminal LD, the pulse is inputted to the load terminal LD. Therefore, the speed instruction data (for example, this data assumes "n" in the decimal expression) inputted to the preset terminal PS is supplied to the counter 10 and the count-down operations are carried out such that "n"→"n-1"→"N-2" ... "3"→"2"→"1"→"0". After completion of the count-down operations, the speed instruction data "n" is again taken into the counter 10 and the operations similar to the above are repeated. Namely, the pulse signal of which the clock signal was frequency divided by the speed instruction data is outputted to the borrow terminal BO.

The period of the pulse signal which is outputted from the borrow terminal BO is inversely proportional to a set speed of the pulse motor. The period of the borrow pulse signal is large when the rotating speed of the pulse motor is low. The period of the borrow pulse signal is small when the speed is high.

On the other hand, the position instruction data of the pulse motor set by the position setting device 26 is inputted to the input terminal A of the comparator 16. The count value of the position counter 18 is inputted to the input terminal B of the comparator 16. Now, assuming that the rotor of the pulse motor 24 is located at a predetermined reference position, the count value of the position counter 18 is "0", namely, "B=0" (in the decimal expression).

It is now assumed that "a" (decimal expression) is inputted as the position instruction data. In this case, since "a" is larger than 0, an "H" level signal is outputted from the comparator 16 to the AND gate 14. Thus, the pulse signal which is outputted from the borrow terminal BO of the frequency dividing counter 10 passes through the AND gate 14 and is inputted to the drive circuit 28 of the pulse motor 24, thereby allowing the pulse motor 24 to be rotated clockwise by a predetermined amount. Simultaneously, the pulse signal is inputted to the count-up terminal CU of the position counter 18 and the count value of the counter 18 changes from "0" to "1". When this count value is smaller than the position instruction data "a", the above-mentioned operations are repeated.

When the pulse motor 24 continuously rotates clockwise and the count value of the counter 18 becomes "a", the values of both inputs A and B of the comparator 16 become "a" and coincide with the position instruction data "a". Thus, an "H" level signal is not outputted to the AND gates 12 and 14, so that the pulse motor 24 stops. Next, it is assumed that "b" (b<a) is given as the position instruction data to the comparator 16. In this case, an "H" level signal is outputted from the comparator 16 to the AND gate 12. Therefore, the pulse signal which is outputted from the borrow terminal BO of the counter 10 passes through the AND gate 12 and is inputted to the drive circuit 28 of the pulse motor 24, thereby allowing the pulse motor 24 to be rotated counterclockwise by a predetermined amount. Simultaneously, the pulse signal is inputted to the count-down terminal CD of the position counter 18, so that the count value of the counter 18 is decreased from "a" to "a−1". When this count value is larger than the position instruction data "b", the above-mentioned operations are repeated.

When the pulse motor 24 continuously rotates counterclockwise and the count value of the position counter 18 becomes "b", the values of the inputs A and B of the comparator 16 become "b" and coincide with the position instruction data "b", so that the pulse motor 24 stops.

As described above, according to the conventional example shown in FIG. 1, the speed is controlled by changing the period of the pulse which is outputted from the frequency dividing counter 10. Further, the current position is detected by the position counter 18 and compared with the instructed position, thereby allowing the pulse motor 24 to be rotated clockwise (CW) or counterclockwise (CCW).

However, such a conventional technology has the following drawbacks. In general, pulse motors have the characteristics such that the torque of the pulse motor decreases as the moving velocity, i.e., the rotating speed increases and the pulse motor moves and rotates while vibrating for each step due to the influence of the inertial load around the rotor.

For example, as shown in FIG. 2, in the case where the rotor of the pulse motor sequentially advances in a stepwise manner from the position of step "", the portion indicated by a broken line in FIG. 2 is as enlargedly shown in FIG. 3. Namely, the rotor vibrates around a position P where the rotor must stop and settles to the position P after an expiration of a constant period of time. Therefore, if a high speed range is instructed as the rotating speed, the rotating speed of the rotor is shifted to the speed position of the next step while the rotor is vibrating. However, at this time, if the position instruction is changed to a command of reverse motion, the torque component on the rotor of such command is superimposed on the holding and inertia torques at the new detent position of the rotor, so that no resultant torque on the rotor can be produced and a step-out phenomenon occurs due to the lack of torque. Consequently, the motor cannot be controlled.

SUMMARY OF THE INVENTION

It is an object of the present invention to provide a pulse motor control apparatus in which even if the rotating direction of the pulse motor is switched to the opposite direction while the pulse motor is rotating, no step-out phenomenon occurs and the motor can smoothly rotate in the opposite direction.

Another object of the invention is to provide an economical pulse motor control apparatus in which by merely adding a simple circuit to a conventional control circuit, the pulse motor can smoothly rotate in the opposite direction without causing a step-out phenomenon.

Briefly speaking, according to the pulse motor control apparatus of the present invention, when new position data which requires reverse rotation of the pulse motor is set while the pulse motor is rotating, the reverse rotation control is determined by comparing the position data which is set at present with the new position data; when the reverse rotation control is determined, an output of a control pulse to the pulse motor is stopped for a constant period of time set in consideration of the settling time of the pulse motor; and after an expiration of this stop period of time, a control pulse to reversely rotate the pulse motor is outputted on the basis of the new position data.

The above and other objects, features, and advantages of the present invention will become more apparent from the following detailed description with reference to the accompanying drawings. It is to be understood, however, that the drawings are for purpose of illustration only and not intended as a definition of the limits of the invention.

BRIEF DESCRIPTION OF THE DRAWINGS

FIGS. 5A to 5J are timing charts showing the operation of the embodiment of FIG. 4, respectively.

DETAILED DESCRIPTION OF THE PREFERRED EMBODIMENT

Figure 4:
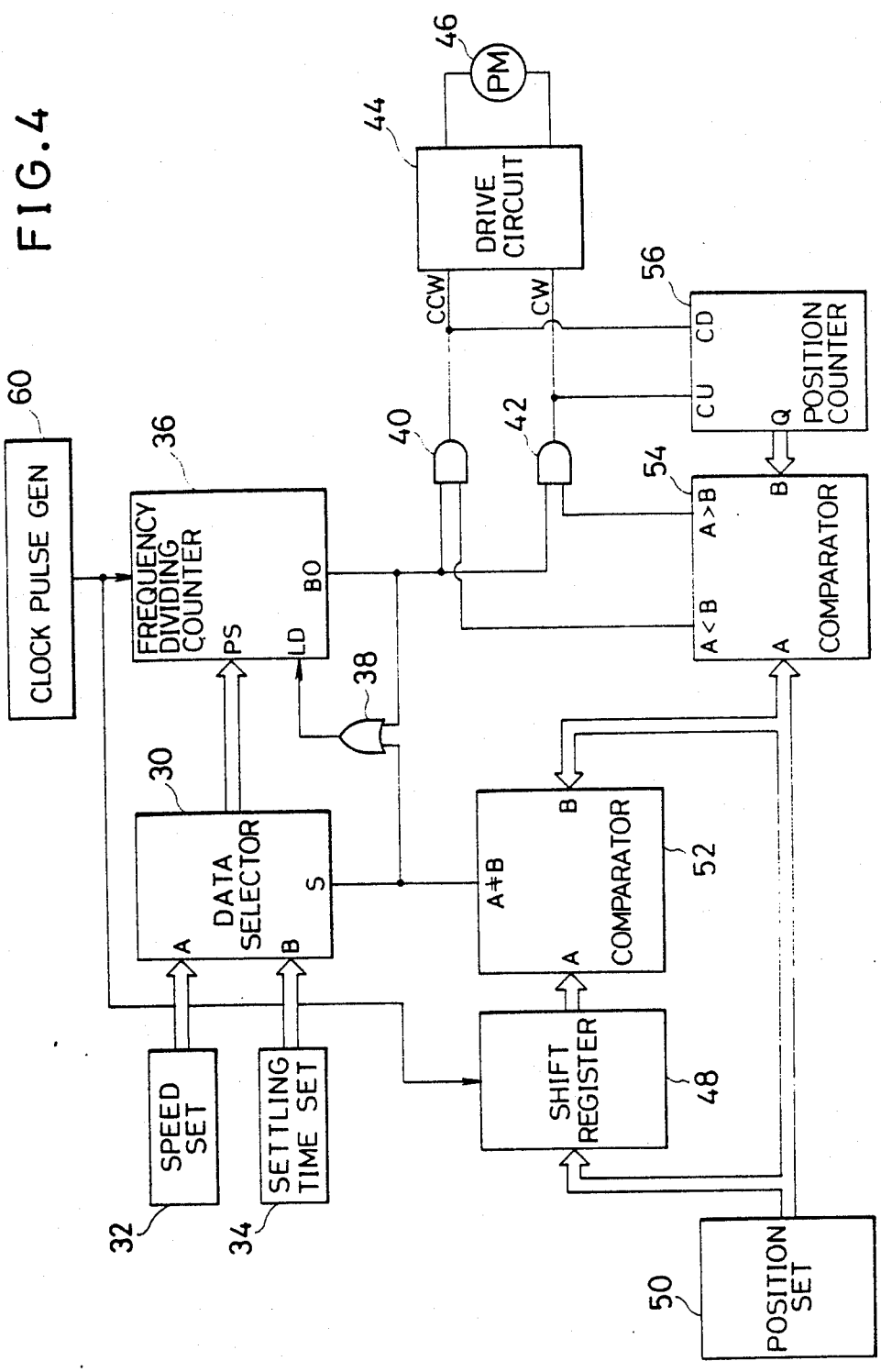
FIG. 4 is a block diagram showing an embodiment of a pulse motor control apparatus according to the present invention.

Referring now to FIG. 4, speed instruction data indicative of a rotating speed of a rotor of a pulse motor 46 is inputted from a speed setting device 32 to an input terminal A of a data selector 30. Settling time set data is inputted from a settling time setting device 34 to an input terminal B of the data selector 30.

As a speed setting device 32, for example, it is possible to use a thumb-wheel digital switch manufactured by Copal Corporation in Japan. The speed expressed by two digits of decimal notation is outputted as speed instruction data of a BCD code of, e.g., eight bits. In addition, for example, a thumb-wheel digital switch manufactured by Copal Corporation in Japan may be also used as the settling time setting device 34. Assuming that the time is expressed by decimal notation, the time data is outputted as settling time set data of, e.g., eight bits.

The data selector 30 switches and outputs either of the speed instruction data from the speed setting device 32 and the settling time set data from the settling time setting device 34 on the basis of a signal which is supplied to a selecting terminal S of the data selector 30. An output of the data selector 30 is connected to a preset terminal PS of a frequency dividing counter 36. The counter 36 counts down the data preset on the basis of a clock signal from a clock pulse generator 60 and has a borrow terminal BO. Upon completion of the countdown operation, a borrow signal is outputted to the borrow terminal BO. The borrow terminal BO of the counter 36 is connected to a load terminal LD of itself through an OR gate 38 having two input terminals. The borrow terminal BO is also connected to one input of each of AND gates 40 and 42 each having two input terminals, respectively.

On the other hand, position instruction data indicative of the rotating position of the rotor of the pulse motor 46 is inputted from a position setting device 50 to an input terminal B of a shift register 48.

For example, a thumb-wheel digital switch manufactured by Copal Corporation in Japan may be used as the position setting device 50. Assuming that the position data is expressed by two digits of decimal notation, it is outputted as the position instruction data of the BCD code of, e.g., eight bits.

The shift register 48 temporarily stores the position instruction data received for a period of one clock or one bit in response to a clock pulse which is generated from the clock pulse generator 60. An output of the shift register 48 is connected to an input terminal A of a comparator 52. The comparator 52 compares input data of input terminals A and B and outputs an "H" level signal only when they differ. An output of the comparator 52 is connected to the selecting terminal S of the data selector 30 and to an input of the OR gate 38, respectively.

Figure 1:
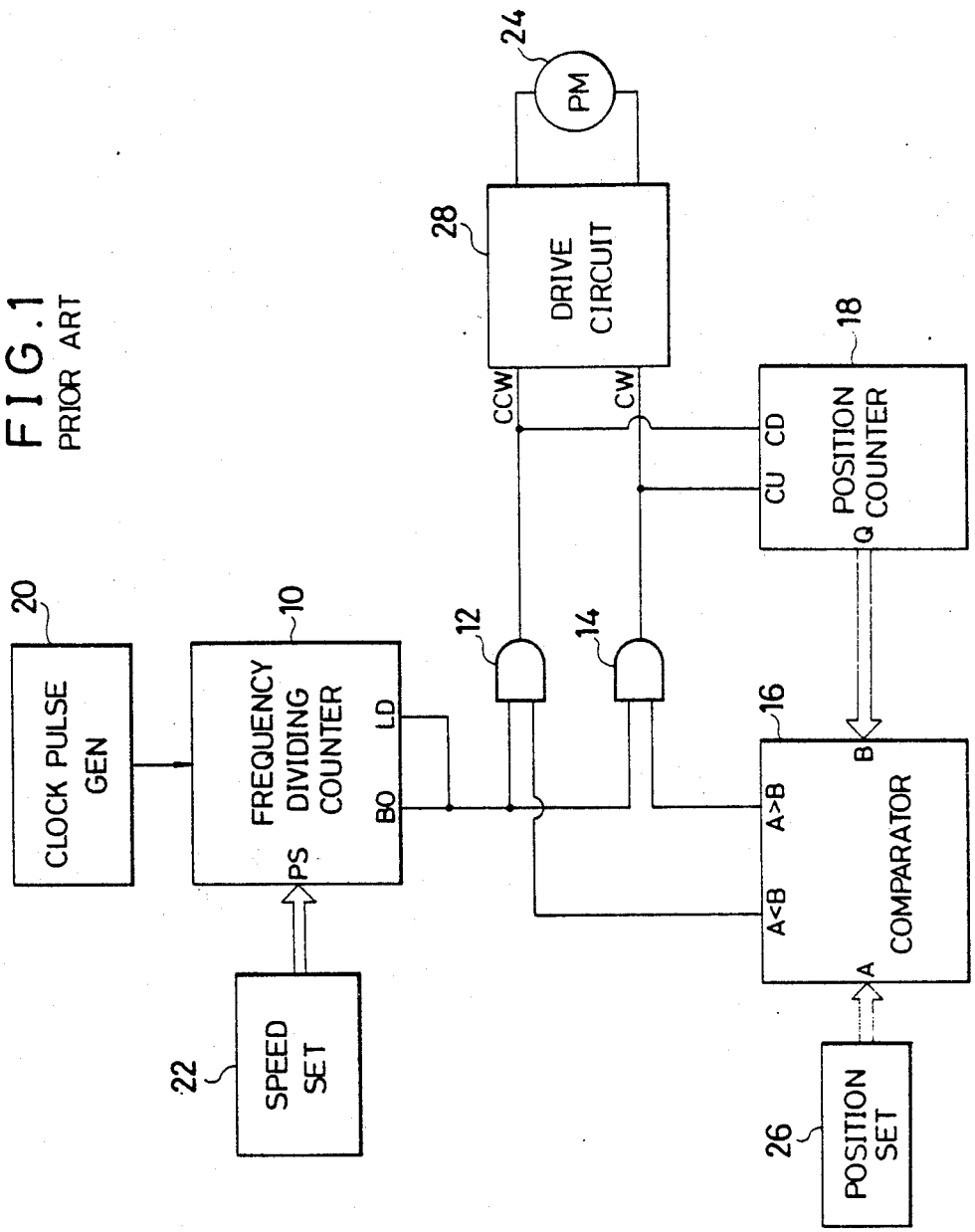
FIG. 1 is a block diagram showing a conventional pulse motor control apparatus.
Figure 2:
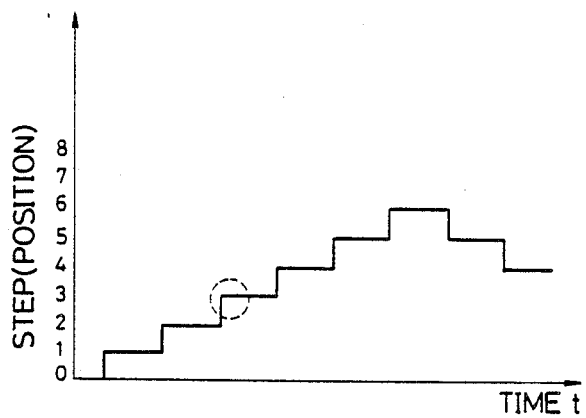
FIG. 2 is a time chart showing a change in a rotating step position of a pulse motor according to the conventional apparatus.

The position instruction data from the position setting device 50 is also inputted to an input terminal A of another comparator 54. An output Q of a position counter 56 is connected to an input terminal B of the comparator 54. Count data of the counter 56 is outputted as the output Q. An output of the AND gate 42 is connected to a count-up terminal CU of the position counter 56 and an output of the AND gate 40 is connected to a count-down terminal CD of the counter 56. The counter 56 is similar to that shown in FIG. 1 and performs the count-up and count-down operations in accordance with pulses which are inputted to the terminals CU and CD. The count data of the position counter 56 is compared with the position instruction data from the position setting device 50 by the comparator 54. Namely, input data A and B are compared and a signal at an "H" level as a logic value is outputted to the AND gate 40 when A is smaller than B. A signal at an "H" level as a logic value is outputted to the AND gate 42 when A is larger than B.

Outputs of the AND gates 40 and 42 are connected to a drive circuit 44 of the pulse motor 46, respectively. A driving pulse signal is inputted to the drive circuit 44. Namely, a CCW instruction pulse to rotate the pulse motor 46 counterclockwise (CCW) is inputted from the AND gate 40 to the drive circuit 44. A CW instruction pulse to rotate the pulse motor 46 clockwise (CW) is inputted from the AND gate 42 to the drive circuit 44.

The whole operation of the embodiment will then be described with reference to time charts of FIGS. 5A to 5J.

First, the clock signal from the clock pulse generator 60 shown in FIG. 5A is inputted to the counter 36 and shift register 48, respectively. The counter 36 frequency divides the clock signal by the preset data and outputs a pulse to the borrow terminal BO. In detail, the data selector 30 ordinarily selects speed instruction data VA and this data is inputted to the preset terminal PS of the counter 36 (refer to FIG. 5B). The counter 36 always executes the count-down operation in response to the clock signal. Upon each completion of the count-down operation, a borrow pulse is outputted to the borrow terminal BO (refer to FIG. 5C). This borrow pulse is inputted to the load terminal LD through the OR gate 38. The speed instruction data VA of the preset terminal PS is again received and the count-down operation is carried out. The above operations are repeated and the pulse of which the clock signal was frequency divided by the speed instruction data VA is outputted from the borrow terminal BO to the AND gates 40 and 42.

The position instruction control will then be described. For instance, "200" (decimal notation) is set as the position instruction data into the position setting device 50 (refer to FIG. 5D). Assuming that the rotor of the pulse motor 46 is located at the position of "100" (decimal notation) at time $t_1$, there is the relation of A>B between the inputs A and B of the comparator 54 in this case. Therefore, an "H" level signal is outputted from the comparator 54 to the AND gate 42 (refer to FIG. 5E) and a pulse which is outputted from the borrow terminal BO of the counter 36 is supplied as a CW instruction pulse to the drive circuit 44 of the pulse motor 46 (refer to FIG. 5G). On the contrary, a low ("L") level signal is outputted from the comparator 54 to the AND gate 40 (refer to FIG. 5F), so that a CCW instruction pulse is not outputted (refer to FIG. 5H).

In addition, the position instruction data "200" is stored in the shift register 48 (refer to FIG. 5I). The input data A and B are equal in this case. Thus, the output level of the shift register 48 is low "L" (refer to FIG. 5J). Further, assuming that the rotor of the pulse motor 46 is located at the position of step "100" at time $t_1$, it is located at the position of step "103" at time $t_2$ in response to the CW instruction pulse (refer to FIG. 5G).

It is now assumed that at time $t_3$ when the rotor of the pulse motor 46 has not yet reached the position of step "200", a new setting operation is carried out by the position setting device 50 and the new position instruction data, e.g., "50" is set (see FIG. 5D). The new position instruction data "50" is stored into the shift register 48 at time $t_4$ of the clock signal (see FIG. 5I). Thus, the input data A (corresponding to FIG. 5I) and the input data B (corresponding to FIG. 5D) of the comparator 52 differ for the period of time of one bit from time $t_3$ to time $t_4$. Thus, the output level of the comparator 52 becomes "H" for the interval from time $t_3$ to time $t_4$ (see FIG. 5J).

As explained above, the output of the comparator 52 which is at an "H" level for the bit time of $t_3$ to $t_4$ is inputted to the data selector 30, so that settling time set data TS from the settling time setting device 34 is selected for the interval of $t_3$ to $t_4$ and inputted to the preset terminal PS of the counter 36 (refer to FIG. 5B). Simultaneously, the output of the comparator 52 is inputted to the load terminal LD of the counter 36 through the OR gate 38. The settling time set data TS from the data selector 30 is preset. The count-down operation is executed. During this count-down operation, no pulse is outputted from the borrow terminal BO (see FIG. 5C).

On the other hand, the pulse motor 46 is located at the position of step "103" at time $t_2$ and the count value of the position counter 56 is also "103". This count value becomes the input B of the comparator 54. The input data A of the comparator 54 is the newly set position instruction data "50" at time $t_3$, so that A<B. An "H" level signal is outputted to the AND gate 40 (refer to FIG. 5F). However, since no pulse signal is outputted from the borrow terminal BO of the counter 36 which is counting down the settling time set data TS, the CCW instruction pulse is not outputted. The pulse motor 46 is stopped.

Next, at time $t_4$, the output of the shift register 48 becomes "50" and coincides with the position instruction data "50" (see FIGS. 5D and 5I). Therefore, the output level of the comparator 52 becomes "L" (see FIG. 5J). The data selector 30 selects the speed instruction data VA and outputs it to the preset terminal PS of the counter 36 (see FIG. 5B).

After completion of the above operations, when the count-down operation of the settling time set data TS is completed at time $t_5$, a pulse signal is outputted from the borrow terminal BO of the counter 36 (refer to FIG. 5C). This pulse signal becomes the CCW instruction pulse through the AND gate 40 (see FIG. 5H) and is inputted to the load terminal LD through the OR gate 38 and speed instruction data VA is again preset to the counter 36. Thereafter, the similar operations are carried out until the pulse motor 46 reaches the position of step "50" (see FIG. 5H).

Figure 3:
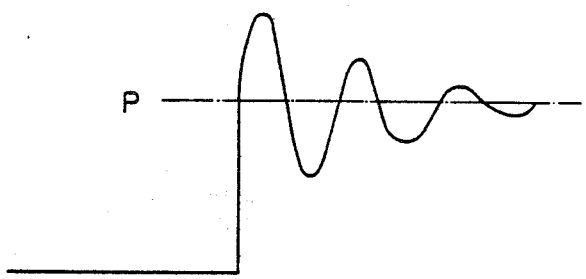
FIG. 3 is an explanatory diagram showing a vibration during a step transition of the pulse motor and enlargedly illustrating the portion indicated by a broken line in FIG. 2.

In the embodiment, the settling time of the pulse motor is determined in consideration of the magnitude of the vibration shown in FIG. 3. Practically speaking, it is decided in consideration of the extent of the inertial moment of the rotor of pulse motor 46, the magnitude of the torque or inertial load, and the like.

The present invention is not limited to the foregoing embodiment but many modifications and variations are possible within the spirit and scope of the appended claims of the invention so as to provide the similar function. As an applied form of this invention, for instance, a hydraulic digital fluid control valve and the like, which have recently come into wide use, are considered. The response speed can be improved by the invention.

According to the pulse motor control apparatus of the invention described above, the lack of torque and step-out phenomenon due to the resultant superposition of reverse, holding and inertia torques at the new rotor detent position which are caused in the case where the position instruction data is changed, particularly, in the case where the rotating direction of the pulse motor is reversed due to the change of the position instruction data can be preferably suppressed by adding a simple circuit. Consequently, the pulse motor can be smoothly rotated at a high speed and the response speed can be also improved.

What is claimed is:

1. A pulse motor control apparatus comprising:
   speed setting means which outputs speed instruction data in response to a setting of a rotating speed of a pulse motor;
   frequency dividing means for frequency dividing a clock signal of a predetermined frequency by said speed instruction data of said speed setting means and outputting a frequency divided pulse;
   position setting means which outputs rotor position instruction data in response to a setting of a desired rotor position of the pulse motor;
   rotor position detecting means for detecting a present rotor position of the pulse motor;
   control pulse switching means for comparing said rotor position instruction data from said position setting means with said present rotor position data from said position detecting means with respect to the number of steps of the rotor of the pulse motor for each of said data, outputting said frequency divided pulse of said frequency dividing means as a forward rotation control pulse to means for driving the pulse motor when the present rotor position data is smaller than the rotor position instruction data, and outputting the frequency divided pulse of said frequency dividing means as a reverse rotation control pulse to said pulse motor driving means when the present rotor position data is larger than the rotor position instruction data;
   settling time setting means which outputs settling time data in response to a setting of a predetermined settling time at the end of which the rotation and vibration of the pulse motor are settled down and the pulse motor is stopped; and
   selecting means for selecting and outputting the speed instruction data of said speed setting means to said frequency dividing means when the setting of the rotor position instruction data by said position setting means is not changed and for selecting and outputting the settling time data of said settling time setting means to said frequency dividing means when a change of the setting of the rotor position instruction data is detected,
   wherein the change of the setting of said rotor position instruction data is detected and the settling time data is selected and outputted to the frequency dividing means by said selecting means, thereby inhibiting the output of the frequency divided pulse for a constant period of time in response to said settling time data, and stopping the pulse motor.

2. A pulse motor control apparatus according to claim 1, wherein said selecting means comprises:
   a data selector for selecting and outputting either the speed instruction data of said speed setting means or the settling time data of said settling time setting means to said frequency dividing means;
   a shift register for delaying the rotor position instruction data of said position setting means by a time of a clock period of said clock signal and outputting said delayed data; and
   a comparator for comparing an output of said shift register with the set desired position of said position setting means and instructing said data selector to select the speed instruction data when they coincide and instructing the data selector to select the settling time data when they do not coincide.

* * * * *